United States Patent
Dong et al.

(10) Patent No.: US 9,354,962 B1
(45) Date of Patent: May 31, 2016

(54) MEMORY DUMP FILE COLLECTION AND ANALYSIS USING ANALYSIS SERVER AND CLOUD KNOWLEDGE BASE

(71) Applicant: EMC Corporation, Hopkinton, MA (US)

(72) Inventors: Dazhi Dong, Shanghai (CN); Hui Gao, Shanghai (CN); Bruce R. Rabe, Dedham, MA (US); Scott E. Joyce, Foxboro, MA (US); Xiaogang Wang, Shanghai (CN); Binhua Lu, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 213 days.

(21) Appl. No.: 14/023,016

(22) Filed: Sep. 10, 2013

(51) Int. Cl.
*G06F 11/00* (2006.01)
*G06F 11/07* (2006.01)

(52) U.S. Cl.
CPC .......... *G06F 11/079* (2013.01); *G06F 11/0766* (2013.01); *G06F 11/0778* (2013.01)

(58) Field of Classification Search
CPC ............ G06F 11/0703; G06F 11/0706; G06F 11/0766; G06F 11/0778; G06F 11/0784; G06F 11/0787; G06F 11/079; G06F 11/0793; G06N 5/00
See application file for complete search history.

(56) References Cited

U.S. PATENT DOCUMENTS

| | | | | |
|---|---|---|---|---|
| 7,007,200 | B2* | 2/2006 | Salem | G06F 11/0778 706/45 |
| 7,191,364 | B2* | 3/2007 | Hudson | G06F 11/0748 707/999.202 |
| 7,941,707 | B2* | 5/2011 | Sarig | G06F 11/0748 714/47.1 |
| 7,991,793 | B2* | 8/2011 | Normington | G06F 17/3012 707/792 |
| 8,655,336 | B1 | 2/2014 | Dempski et al. | |
| 8,713,300 | B2* | 4/2014 | Clifford | G06F 11/1464 713/150 |
| 2014/0068568 | A1 | 3/2014 | Wisnovsky | |

OTHER PUBLICATIONS

Dictionary of Electrical and Computer Engineering. (2004). New York, NY: McGraw-Hill. pp. 180 and 225.*

* cited by examiner

*Primary Examiner* — Bryce Bonzo
*Assistant Examiner* — Anthony J Amoroso
(74) *Attorney, Agent, or Firm* — BainwoodHuang

(57) ABSTRACT

An automatic technique for a timely diagnostic uses a cloud service and includes (1) after a memory dump file is generated, uploading the dump file and system configurations to an analysis server, (2) extracting key call stacks from the dump file in the server, (3) searching a cloud-based knowledge base for entries corresponding to contents of the call stack and the system configurations (like model, SW version, etc.), these entries representing known issues having similar call stack contents and/or system configurations. If relevant knowledge base entries are found, then they are used to identify a root cause and suggest solutions. If no relevant knowledge base entries are found, this result is reported along with any other potentially useful data from the dump file analysis, such as an identification of a product area for a program identified by the dump file name.

22 Claims, 4 Drawing Sheets

MEMORY DUMP FILE COLLECTION AND ANALYSIS USING ANALYSIS SERVER AND CLOUD KNOWLEDGE BASE

BACKGROUND

The present invention is directed to the field of error diagnosis in computer systems, and in particular to diagnosis techniques using memory dump files that are generated by operating software under error conditions.

In the operation of computer systems it is known to generate a copy of system memory at a time that an unusual error condition occurs (i.e., an error condition not addressed by normal error-handling functionality of the operating software affected by the error). Such copies of system memory are referred to as "dumps" or "memory dumps", and they include a variety of potentially useful information in raw and often voluminous form. Software developers and system support engineers analyze memory dumps to glean the system operating state at the time an error occurred, this information being useful in diagnosing logic or other programming errors that have contributed to the error itself or to the system's undesired response to a separate error occurring during operation.

SUMMARY

There are certain drawbacks to known techniques for using memory dumps in the diagnosis of errors. In some cases there may be a large number of computerized devices (e.g., server computers, storage arrays, or other devices executing sophisticated software suites) in a data center or campus setting, and it may be difficult for a support organization to adequately respond to all cases in which memory dumps are generated. As dump files are very large, they may only be maintained for short periods before being removed or replaced by new dump files, so that the record of a particular error condition may be lost before it can be analyzed. These issues may be particularly significant in a computer system used for development or testing purposes, and even in more stable production systems when configuration changes occur that give rise to error conditions. Thus, there is a need for more responsive and automated tools for memory dump collection and analysis to enable robust responses to error conditions.

A method is disclosed of operating an analysis server computer to support diagnosis of error conditions occurring in computerized devices of a data center to which the analysis server computer is communicatively coupled. In one disclosed example the computerized devices are a set of storage arrays interconnected by a local network. The computerized devices are operative when the error conditions occur to generate corresponding memory dump files containing current memory contents of the computerized devices. In operation, the analysis server receives a memory dump file of one of the computerized devices and analyzes the memory dump file to identify configuration data and call stack data of one or more program call stacks, wherein the configuration data describes a software and/or hardware configuration of the computerized device when an error condition occurred and the call stack data describes the program call stacks and an operating state of the computerized device when the error condition occurred.

The analysis server uses the call stack data to search a knowledge base for corresponding entries having identical or similar corresponding program call stacks. Entries of the knowledge base identify respective problems known to result in corresponding error conditions and program call stacks, and identify respective solutions to the problems.

Upon finding an entry in the knowledge base corresponding to the call stack data, the analysis server uses the problem and solution identified by the knowledge base entry to create a first report for sending to an administrator of the data center to be used by the administrator in diagnosing and resolving the error condition. Upon not finding an entry in the knowledge base corresponding to the call stack data, the analysis server creates a second report for sending to the administrator, the second report identifying the occurrence of the error condition and the absence of a corresponding entry in the knowledge base.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

In storage products such as storage arrays, applications executed in the products may meet exceptions or disasters and generate memory dump files. In many cases these dump files may not be used to maximum benefit. If time passes before a support engineer or system administrator takes action, the dump files and other diagnostic materials may no longer be accessible or relevant, because customer configurations may change and log files may rotate and disappear. Additionally, it is time consuming for support engineers to diagnose, find root causes and give solutions.

In general, a disclosed technique provides an automatic way for a timely diagnostic using a cloud knowledge base service:

1. After a dump file is generated, upload the dump file and the system configurations to a centralized and customer authorized place or private server.
2. Extract key call stacks for the dump file in the server.
3. Search a cloud-based knowledge base for entries corresponding to contents of the call stack and the system configurations (like model, SW version, etc.), these entries representing known issues having similar call stack contents and/or system configurations.
4. If relevant knowledge base entries are found, use them to identify a root cause and suggest solutions.
5. If no relevant knowledge base entries are found, report this result along with any other potentially useful data from the dump file analysis, such as an identification of a product area for a program identified by the dump file name.

The cloud service may be merged with other related services, such as a "Call Home" service used by storage arrays sold by EMC Corporation. The cloud service records all the dump call stacks, software versions, system configurations, root causes and solutions as known or discovered. Customers and support engineers can send the call stacks to the cloud service, find the root cause, solutions and suggestions, etc. if there is already a known issue.

Figure 1:
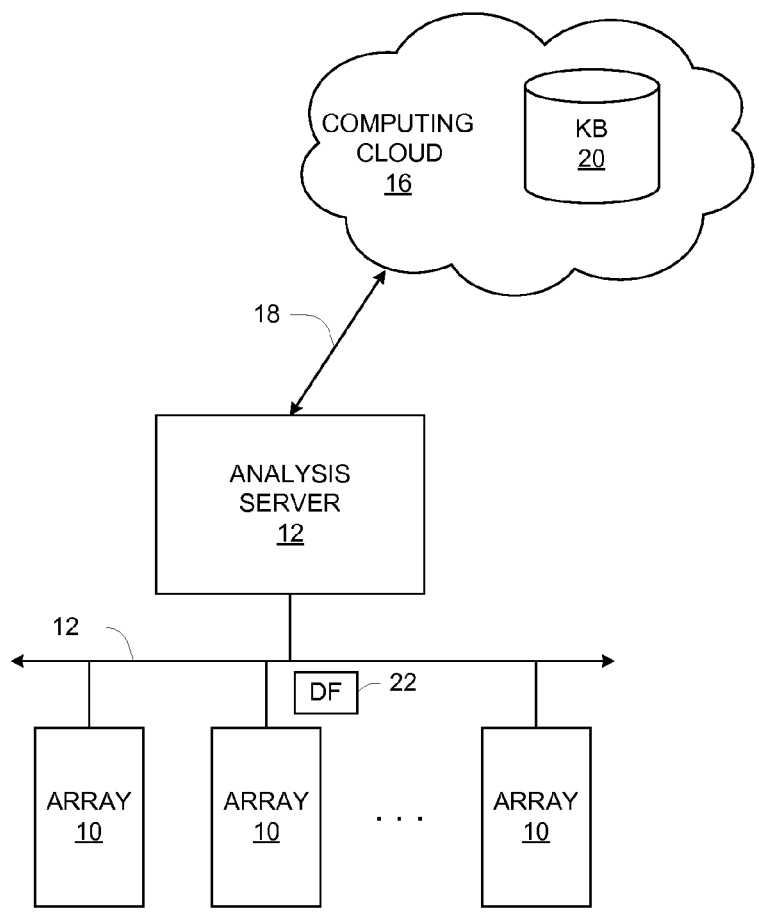
FIG. 1 is a block diagram of a computer system.

FIG. 1 shows a system having a collection of storage arrays (ARRAY) 10 providing storage resources for separate compute servers (not shown). The arrays 10 are coupled to a local network 12. In the embodiment of FIG. 1 an analysis server 14 is also coupled to local network 12 so as to be in communication with the arrays 10. The analysis server 14 is also coupled to a computing cloud 16 via a connection 18. As generally known in the art, the computing cloud 16 includes compute, storage and communications resources that may be flexibly deployed and allocated among different external users according to a cloud computing arrangement or model. In the arrangement of FIG. 1, the computing cloud 16 hosts a database service used for diagnosis of error conditions occurring in the arrays 10. In particular, the computing cloud 16 includes a specialized database shown as a knowledge base (KB) 20 serving as an accessible store for diagnostic information which is used in a manner described herein.

In one embodiment the arrays 10, network 12 and analysis server 14 all reside within a single local-area computing environment, for example an organization's data center or "campus" which is typified by shared administrative control and relatively high bandwidth interconnections for data transfer among the system components. The connection 18 to the cloud 16 is assumed to provide substantially less data communications bandwidth than that of the local network 12.

System operation includes the generation, communicating, and analysis of large memory dump files or "dump files" (DF) 22. Under certain error conditions, the dump files 22 are generated within the arrays 10 and they are stored for some period so as to be available for examination and use by support personnel and various tools. In the illustrated system, the arrays 10 send the dump files 22 over the local network 12 to the analysis server 14 where specialized diagnostic processing occurs. Additionally, the analysis server 14 accesses the knowledge base 20 via the connection 18 as part of the diagnostic processing of the dump files, as described more below.

Figure 2:
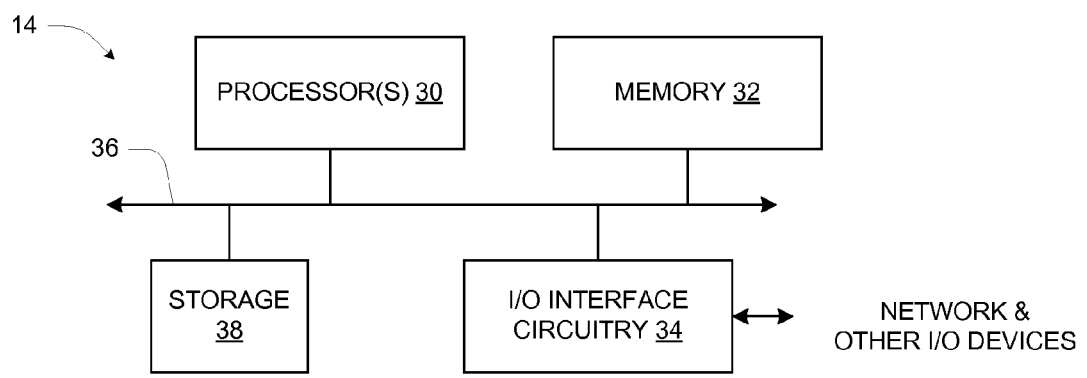
FIG. 2 is a block diagram of a computerized device.

FIG. 2 shows an example configuration of a physical computer such as the analysis server 14 from a computer hardware perspective. The hardware includes one or more processors 30, memory 32, and interface circuitry 34 interconnected by data interconnections 36 such as one or more high-speed data buses. The interface circuitry 34 provides a hardware connection to the networks 12, 18 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of an analysis application, such as described below, can be referred to as an analysis circuit or analysis component, and it will be understood that a collection of such circuits or components can all be realized and interact with each other as one or more sets of computer processing hardware executing different computer programs as generally known in the art.

Figure 3:
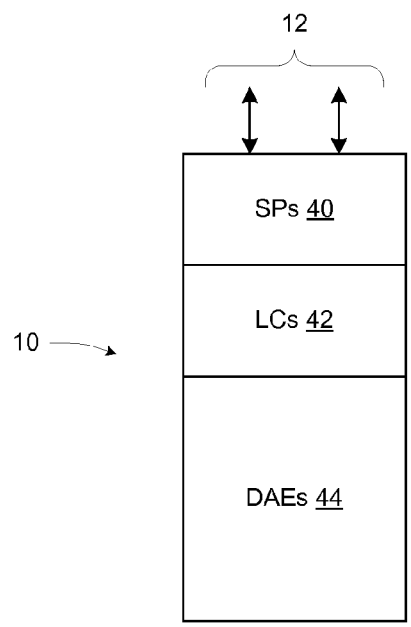
FIG. 3 is a block diagram of a storage array in the computer system from a hardware perspective.

FIG. 3 shows an example configuration of a storage array 10 from a hardware perspective. It includes one or more storage processors (SPs) 40, link controllers (LCs) 42, and disk array enclosures (DAEs) 44. A disk array enclosure 44 is a modular component housing multiple storage devices such as magnetic or solid-state disk drives and a disk controller having a Fiber Channel or other storage-oriented external interface. The DAEs 44 are interconnected by one or more storage interconnect buses (not shown), such as Fiber Channel buses in a "loop" configuration as generally known, and these buses are under control of the link controllers 42. The storage processors 40 provide overall control of array operation including external interfaces to the local network 12. At a low level the storage processors 40 provide "data mover" functionality for executing high-bandwidth data transfers between the local network 12 and storage devices of the DAEs 44 utilizing storage-oriented protocols such as SCSI and Fiber Channel protocols. At a higher level, the SPs 40 execute application software providing higher-level control and monitoring functionality. For example, one or more of the SPs 40 may execute a storage management application providing a rich set of control and monitoring functions to a storage administrator responsible for operation of the entire set of arrays 10. Specific examples, including a storage management application known as Unisphere® sold by EMC Corporation, are discussed below.

Figure 4:
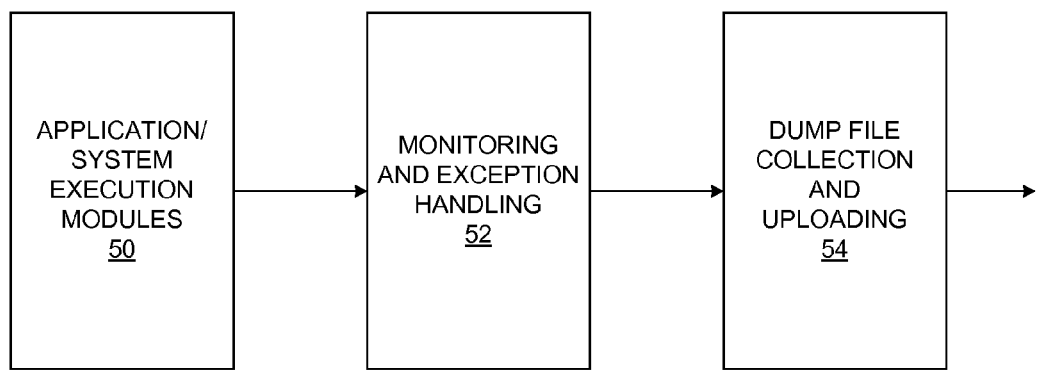
FIG. 4 is a block diagram of the storage array from a software perspective.

FIG. 4 shows an arrangement of an array 10 from a software perspective, i.e., showing organization of various programs executed by the SPs 40. The essential operating software includes application and system execution modules 50. These include the array's operating system (O/S) that may provide the above-mentioned data mover functionality, along with higher-level software such as storage management software and certain middle-level software. Specific examples are discussed below. The application/system execution modules 50 collectively provide the essential system-level functionality of the array 10, i.e., data storage services along with administrative interfaces to manage those services.

The array software further includes monitoring and exception handling modules 52 and dump file collection and uploading modules 54. These modules are directed to more unusual aspects of array operation, including unusual error conditions that cause exception processing to occur. In the present context the term "exception" describes an event occurring during operation of system/application software that may be caused by error conditions. As generally known, exceptions can be detected by various means and then "handled", or responded to, by executing specialized routines referred to as "exception handlers", which in the illustrated embodiment are part of the modules 52.

In some cases, exceptions are of such a nature that continued execution of an affected software module may be impossible. In such cases, it is common for exception handling to include copying (or "dumping") the current contents of primary memory into a dump file 22. As generally known, dump files 22 may be quite large (e.g., on the order of 100 Mbytes). The information thus captured can be examined or analyzed to attempt to identify the error condition that caused the exception to occur, so that ameliorative action may be taken to avoid such conditions in the future. Thus, as dump files 22 are generated by the monitoring and exception handling modules 52, they are provided to the dump file collection and uploading modules 54, which in turn forward the dump files 54 to the analysis server 14 (FIG. 1) where they are analyzed as described below.

Figure 5:
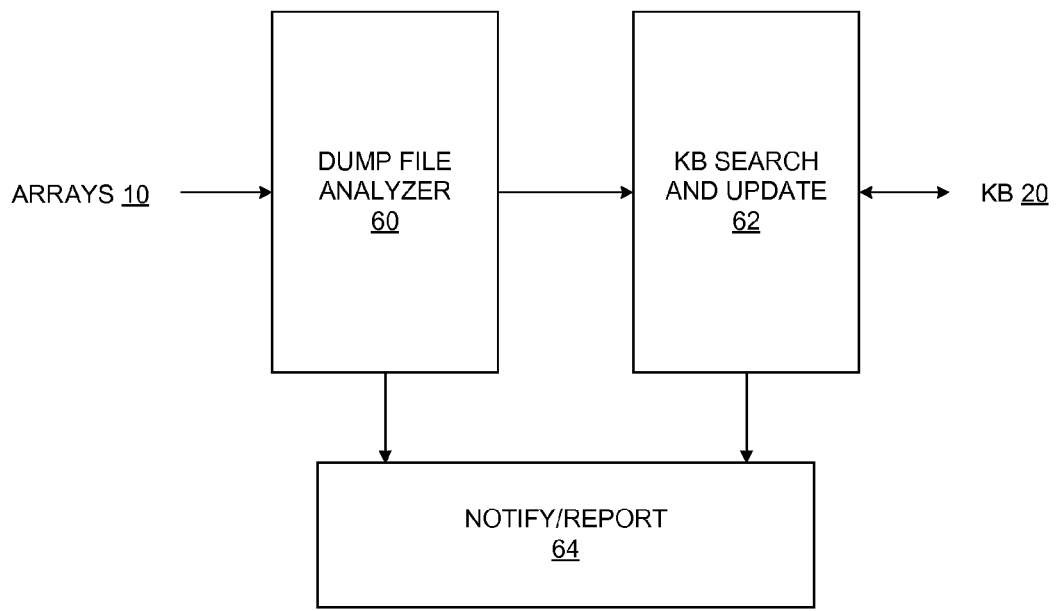
FIG. 5 is a block diagram of an analysis server from a software perspective.

FIG. 5 shows pertinent aspects of the analysis server 14 from a software perspective. It includes a dump file analyzer 60, a knowledge base search and update module 62, and a notify/report module 64. The dump file analyzer 60 processes the dump files 22 to obtain certain information useful for identifying aspects of the underlying error conditions as well as potentially diagnosing the error conditions. Information from the analysis is used by KB search and update module 62 to search the KB 20 for information relating to specific errors as reflected in the contents of the dump files. For example, a specific pattern of information may correspond to a known error condition having a known solution as stored in the KB 20. This information can be retrieved by the KB search and update module 62 when the same pattern occurs in a current dump file. The processing by the dump file analyzer 60 and KB search and update module 62 is used by the notify/report module 64 to generate notifications and/or reports for use by system administrators. In one embodiment, notifications generated by the module 64 are used to provide visual alert indications in a graphical user interface of a storage management application executing on the array 20 or on a separate workstation in the system. Reports may be packaged and delivered as files or electronic mail messages (or both) to designated administrative users.

It is noted that there is also a process of updating the contents of the knowledge base 20, i.e., adding new information about new patterns of call stack data that may correspond to previously unknown error conditions. Updating may occur in part as a side-effect of a search, i.e., when a search yields no results the KB 20 may itself create new entry(ies) for the call stack pattern along with an indication that no solution is yet known. If a solution is identified at a later time, there can be a separate process of adding that solution information to the entry(ies). Updating may also be done in a separate process in which the KB search and update module 62 sends an explicit update request with the new information to the KB 20.

Figure 6:
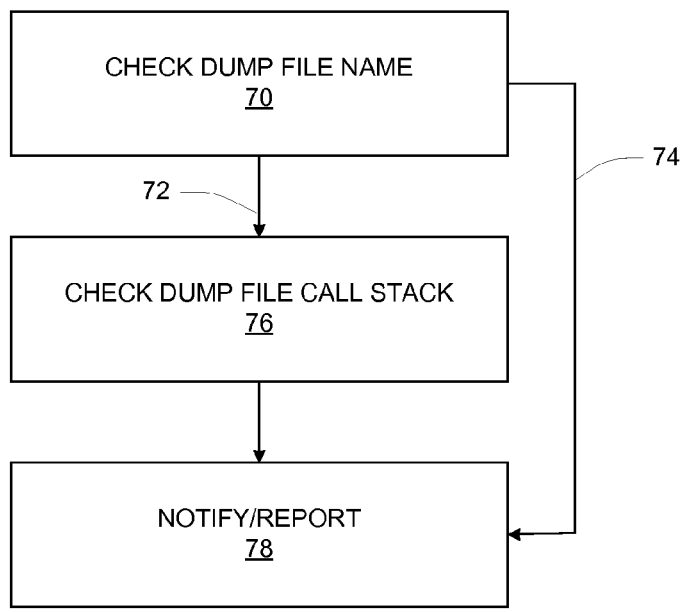
FIG. 6 is a flow diagram of operation of an analysis server.

FIG. 6 is a high-level description of dump file processing as performed by the analysis server 14 using the modules of FIG. 5. At 70 the dump file name is examined, and based on the dump file name processing proceeds along either a first path 72 or a second path 74. For certain types of dump file names processing continues along the first path 72 to an additional processing step 76, and for other types of dump file names processing proceeds along the second path 74 to a notifying/reporting step 78, bypassing the processing step 76. In the processing step 76, the contents of the dump file 22 are examined specifically to identify a "call stack", i.e., an in-memory structure identifying software modules that were actively inter-operating at the time the exception leading to the memory dump occurred. For this task a software tool such as a debugger may be used. The call stack also includes certain operating state data for the identified modules. Example are given below. The processing of the call stack also generates information used for notification/reporting at 78.

In the notifying/reporting step 78, upon finding an entry in the knowledge base 20 corresponding to the call stack data, problem and solution information identified by the entry is used to create a first report for sending to a system administrator to be used in diagnosing and resolving the error condition. If an entry has not been found in the knowledge base corresponding to the call stack data, then a second report is created and sent to the administrator. This report just identifies that an error condition causing the dump has occurred, and indicates that no corresponding entry was found in the knowledge base.

Below is an example of a work flow that can be used for processing a dump file 22 with the aim of identifying a cause of an error condition so that any available known solution can be used. Alternatively, the information can be used to describe a new (previously unknown) error condition, both as an aid for diagnosis of the current error condition and as input to the KB 20 to retain a memory of the error condition in the event that a solution is later found and recorded in the KB 20.

In this example the workflow includes the following:
1. Employ tables or other data arrangements at 70 to associate dump file names with product areas or modules.
2. Employ tools at 76 for extracting call stacks. Known tools for this purpose include cbd.exe, gdb, etc.
3. Use scripts at 76 to find key words in a call stack and identify a product area or module involved in the error condition. Examples are described below.
4. Search the KB 20 at 78 to identify any known issues having the same or similar call stack and/or file names.

There may be two distinct types of dumps to be handled: exception dumps, and timeout dumps. Examples of their respective processing are described below.

1. Exception Dumps

For exception dumps, one aspect of processing is to determine the product area where the issue (error condition) comes from. Here, "product area" refers to different applications (broadly also including system software) executing on an array 10. For example, the array's operating system may be viewed as belonging to a different product area than does a storage management application running on the array 10, because these different software sub-systems are designed and maintained by different groups or organizations. Determining the product area can be done in two different ways, i.e., using the dump file name (step 70 of FIG. 6) and the call stack (step 76). The call stack indicates that the dump is generated from a certain method/module in a certain file and a certain line (program location in the module), so the product area, file, and method can be searched in the KB 20 to identify whether it is a known issue.

Below are specifics for the above two ways of identifying the product area:

(1) From the Dump File Name (Step 70)

Some dumps will only be generated from specific program modules or product areas, and for these a mapping data structure can be used to identify a module and its corresponding product area based on the file name. In one example, a non-disruptive upgrade (NDU) application module (part of modules 50 in FIG. 4) generates dump files with known names (or structures of names), such as "Ndumom.exe.dmp" for example. In another example, a dump from a kernel module may always have a file name like "SPB_APM00112904711_2db007_09-26-2012_05-21-16.dmp". More specific examples of mapping dump file names to modules or product areas are given below.

(2) From the Call Stack (Step 76)

Certain exceptions are "thrown" (occur) in different program modules. Text strings in the call stack can be search for keywords to identify the product area. In one specific example relating to the Unisphere® storage management application, a string such as "CLARiiONProvider" may be present in the call stack. In another example, a string such as "NavArrayAdminLibrary" may be present when certain administrative software was active at the time the dump occurred.

2. Timeout Dumps

Timeout dumps are generated by timeout exceptions often thrown by applications to indicate some important issues. Two types are considered—administrator request timeout, and application (e.g., Unisphere) provider timeouts. The following outlines the process:

a) Identify a processing thread that has timed out
b) For Admin request timeout dump, find the request sent to a lower level to locate the problem.
   a. Then, search this request in the KB 20 with known timeout request.

b. Find out the known issue.

c) For application provider timeout dump, find out a processing lock which is held.

a. Find out thread information identifying a thread holding the lock b. Search the thread information in KB 20 to locate the known issue Below is a specific example of a table that may be used at 70 (FIG. 6) to associate dump file names with modules 50 ("generators") and their respective "owners" (i.e., applications) for purposes of identifying product area during dump file analysis.

| Name | Generator | 32/64 Bit | Owner | Check Call Stack? |
|---|---|---|---|---|
| cimom_hardware_exception.dmp | Unisphere | 64 Bit | Unisphere | Y |
| Navicimom.exe.dmp | ECOM | 32 bit | Unisphere | Y |
| Navicimom.exe.xxx.dmp | Windows Error Report | 32 bit | Unisphere | Y |
| cimom_provider_time_out.dmp | Unisphere | 64 bit | Unisphere | N |
| cimom_admin_request_time_out.dmp | Unisphere (Admin-Library) | 64 bit | Admin | N |
| CIMOM_PerfCounter_Exceeded.dmp | Unisphere | 64 bit | Unisphere | N |
| Dump_Watchdog.dmp | Watchdog | 64 Bit | Unisphere | N |
| cimom_unhandled_exception.dmp | Unisphere | 32 bit | | N |
| cimom_terminate.dmp | Unisphere | 32 bit | | N |
| NAVI_DSM xxx.dmp | Unisphere | 32 bit | Unisphere | Y |
| NAVI_INITIATOR_xxx.dmp | Unisphere | 32 bit | Unisphere | N |
| Ndumon.exe.dmp | NDU | 32 bit | NDU | N |
| Kernel dump | | | Layered driver | N |

In the above table, those entries having "Y" (yes) in the last column cause processing to proceed to step 76 of FIG. 6. The 32/64 bit value refers to different entry points into the checking at 76, i.e., different ways of invoking the debugger based on whether the dump is of 32-bit date or 64-bit data.

Below is a table mapping module names to respective owners (product areas), usable in the call stack processing of step 76 in FIG. 6.

| Module Name | Owner |
|---|---|
| ClariionProvider | Unisphere |
| ProvisionProvider | Unisphere |
| NTPProvider | Unisphere |
| FlareCom | Core Admin |
| K10FlareAdminLib | Core Admin |
| K10MLUAdminLib | MLU Admin |
| MluSupportUser | MLU Admin |
| K10iSCSIZonesAdminLib | NAL |
| K10NDUAdminLib | NDU |
| CST_Admin | platform |
| csx_rt | platform |
| csx_ci | platform |
| K10HostAdminLib | Hostside |
| K10PsmAdminLib | PSM |

Figure 7:
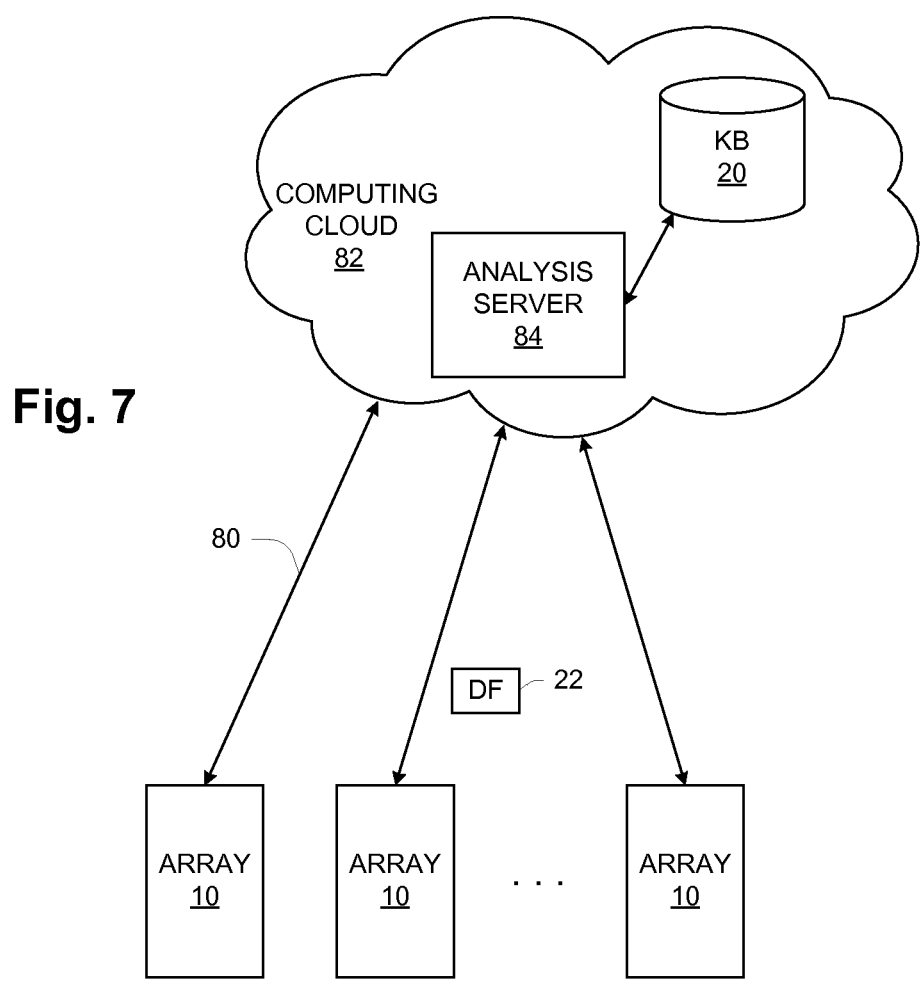
FIG. 7 is a block diagram of a computer system according to another arrangement.

FIG. 7 shows an alternative embodiment in which the arrays 10 have more direct connections 80 to the computing cloud 82, and in which the analysis server 84 resides in the computing cloud 82 rather than being more closely coupled to the arrays 10. This arrangement may be beneficial when the connections 80 provide sufficiently high data transfer rates (bandwidth) that it is possible to efficiently transfer the large dump files 22 to the remotely located analysis server 84.

The presently disclosed technique is generally applicable to computer systems (including storage systems) in which it is desirable to automate the collection and analysis of memory dump files. This may be in a typical production setting, for example to enable a maintenance organization to support use of a production computer system by a customer or other end-user organization. It may also be usable in a more laboratory-like environment in which applications or other software of the system are being developed and/or tested. Analysis of memory dumps can help to diagnose a system's response to unusual and unforeseen operating conditions, which in turn can inform additional design/development to better address such operating conditions.

While various embodiments of the invention have been particularly shown and described, it will be understood by those skilled in the art that various changes in form and details may be made therein without departing from the spirit and scope of the invention as defined by the appended claims.

What is claimed is:

1. A method of operating an analysis server computer to support diagnosis of error conditions occurring in computerized devices of a data center to which the analysis server computer is communicatively coupled, the computerized devices being operative when the error conditions occur to generate corresponding memory dump files containing current memory contents of the computerized devices, the method including the steps, performed by the analysis server, of:

receiving a memory dump file of one of the computerized devices;

analyzing the memory dump file to identify configuration data and call stack data of one or more program call stacks, the configuration data describing a software and/or hardware configuration of the computerized device when an error condition occurred, the call stack data describing the program call stacks and an operating state of the computerized device when the error condition occurred;

using the call stack data to search a knowledge base for corresponding entries having identical or similar corresponding program call stacks, entries of the knowledge base identifying respective problems known to result in corresponding error conditions and program call stacks and identifying respective solutions to the problems;

upon finding an entry in the knowledge base corresponding to the call stack data, using the problem and solution identified by the entry to create a first report for sending to an administrator of the data center to be used by the administrator in diagnosing and resolving the error condition;

upon not finding an entry in the knowledge base corresponding to the call stack data, creating a second report for sending to the administrator, the second report identifying the occurrence of the error condition and the absence of a corresponding entry in the knowledge base;

checking a file name of the memory dump file to identify a product area of a program known to generate memory dump files having the file name; and issuing a notification to the administrator identifying the product area as a source of the memory dump file.

2. A method according to claim 1, further including sending a notification to the administrator via a graphical user interface of a storage management application used to manage the computerized devices of the data center.

3. A method according to claim 2, wherein the storage management application is executed on one of the managed computerized devices.

4. A method according to claim 2, wherein the storage management application is executed on the analysis server.

5. A method according to claim 1, wherein the analysis server is part of a local network of the data center and the knowledge base is hosted in a computing cloud having a communication connection to the data center, the communication connection having lower bandwidth than the local network, and wherein using the call stack data to search the knowledge base includes sending a knowledge base query to the knowledge base via the communication connection.

6. A method according to claim 1, wherein the analysis server is part of a computing cloud that also includes the knowledge base and has respective communication connections to the computerized devices, and wherein the memory dump file is received from the one computerized device via the respective communication connection.

7. A method according to claim 1, wherein checking the file name includes consulting a table mapping a set of file names to corresponding product areas.

8. A method according to claim 1, further including:
checking the call stack data to identify a program module being executed when the error condition occurred, the program module being identifiable by a program module name appearing in the call stack data and having a known association to the program module; and
using the identification of the program module to further identify a product area of a program that includes the program module; and
issuing a notification to the administrator identifying the product area as a source of the memory dump file.

9. A method according to claim 8, wherein using the identification of the program module to further identify a product area includes consulting a table mapping a set of program module names to corresponding product areas.

10. A method according to claim 1, further including:
determining whether the file name of the dump file is a first type of dump file name or a second type of dump file name;
in a first case in which the file name of the dump file is of the first type, performing a processing step that includes the analyzing of the memory dump file, the using of the call stack data, and the creating of either a first report or second report depending on whether or not an entry is found in the knowledge base corresponding to the call stack data; and
in a second case in which the file name of the dump file is of the second type, bypassing the processing step and performing a report generating step based on the file name of the dump file.

11. A method according to claim 10, wherein the second type of dump file name is known to be generated by only certain specific program modules or product areas, and further including use of a mapping data structure to identify a program module and corresponding product area based on the file name.

12. A method according to claim 11, wherein the certain specific program modules include one or more of a non-disruptive upgrade (NDU) application module and a kernel module, and the second type of dump file name has a structure known to be used by the NDU application module or kernel module to name dump files generated thereby.

13. A method according to claim 1, further including use of a table associating the file names of dump files with corresponding module names of program modules and corresponding application names of application programs owning the program modules.

14. A non-transitory computer-readable medium having computer program instructions recorded thereon, the instructions being executable by an analysis server computer to support diagnosis of error conditions occurring in computerized devices of a data center to which the analysis server computer is communicatively coupled, the computerized devices being operative when the error conditions occur to generate corresponding memory dump files containing current memory contents of the computerized devices, the instructions being operative, when executed by the analysis server, to cause the analysis server to perform a method including:
receiving a memory dump file of one of the computerized devices;
analyzing the memory dump file to identify configuration data and call stack data of one or more program call stacks, the configuration data describing a software and/or hardware configuration of the computerized device when an error condition occurred, the call stack data describing the program call stacks and an operating state of the computerized device when the error condition occurred;
using the call stack data to search a knowledge base for corresponding entries having identical or similar corresponding program call stacks, entries of the knowledge base identifying respective problems known to result in corresponding error conditions and program call stacks and identifying respective solutions to the problems;
upon finding an entry in the knowledge base corresponding to the call stack data, using the problem and solution identified by the entry to create a first report for sending to an administrator of the data center to be used by the administrator in diagnosing and resolving the error condition;
upon not finding an entry in the knowledge base corresponding to the call stack data, creating a second report for sending to the administrator, the second report identifying the occurrence of the error condition and the absence of a corresponding entry in the knowledge base;
checking a file name of the memory dump file to identify a product area of a program known to generate memory dump files having the file name; and
issuing a notification to the administrator identifying the product area as a source of the memory dump file.

15. A non-transitory computer-readable medium according to claim 14, wherein the method further includes sending a notification to the administrator via a graphical user interface of a storage management application used to manage the computerized devices of the data center.

16. A non-transitory computer-readable medium according to claim 15, wherein the storage management application is executed on one of the managed computerized devices.

17. A non-transitory computer-readable medium according to claim 15, wherein the storage management application is executed on the analysis server.

18. A non-transitory computer-readable medium according to claim 14, wherein the analysis server is part of a local network of the data center and the knowledge base is hosted in a computing cloud having a communication connection to the data center, the communication connection having lower bandwidth than the local network, and wherein using the call stack data to search the knowledge base includes sending a knowledge base query to the knowledge base via the communication connection.

19. A non-transitory computer-readable medium according to claim 14, wherein the analysis server is part of a computing cloud that also includes the knowledge base and has respective communication connections to the computerized devices, and wherein the memory dump file is received from the one computerized device via the respective communication connection.

20. A non-transitory computer-readable medium according to claim 14, wherein checking the file name includes consulting a table mapping a set of file names to corresponding product areas.

21. A non-transitory computer-readable medium according to claim 14, wherein the method further includes:
   checking the call stack data to identify a program module being executed when the error condition occurred, the program module being identifiable by a program module name appearing in the call stack data and having a known association to the program module; and
   using the identification of the program module to further identify a product area of a program that includes the program module; and
   issuing a notification to the administrator identifying the product area as a source of the memory dump file.

22. A non-transitory computer-readable medium according to claim 21, wherein using the identification of the program module to further identify a product area includes consulting a table mapping a set of program module names to corresponding product areas.

* * * * *